Patented Mar. 12, 1935

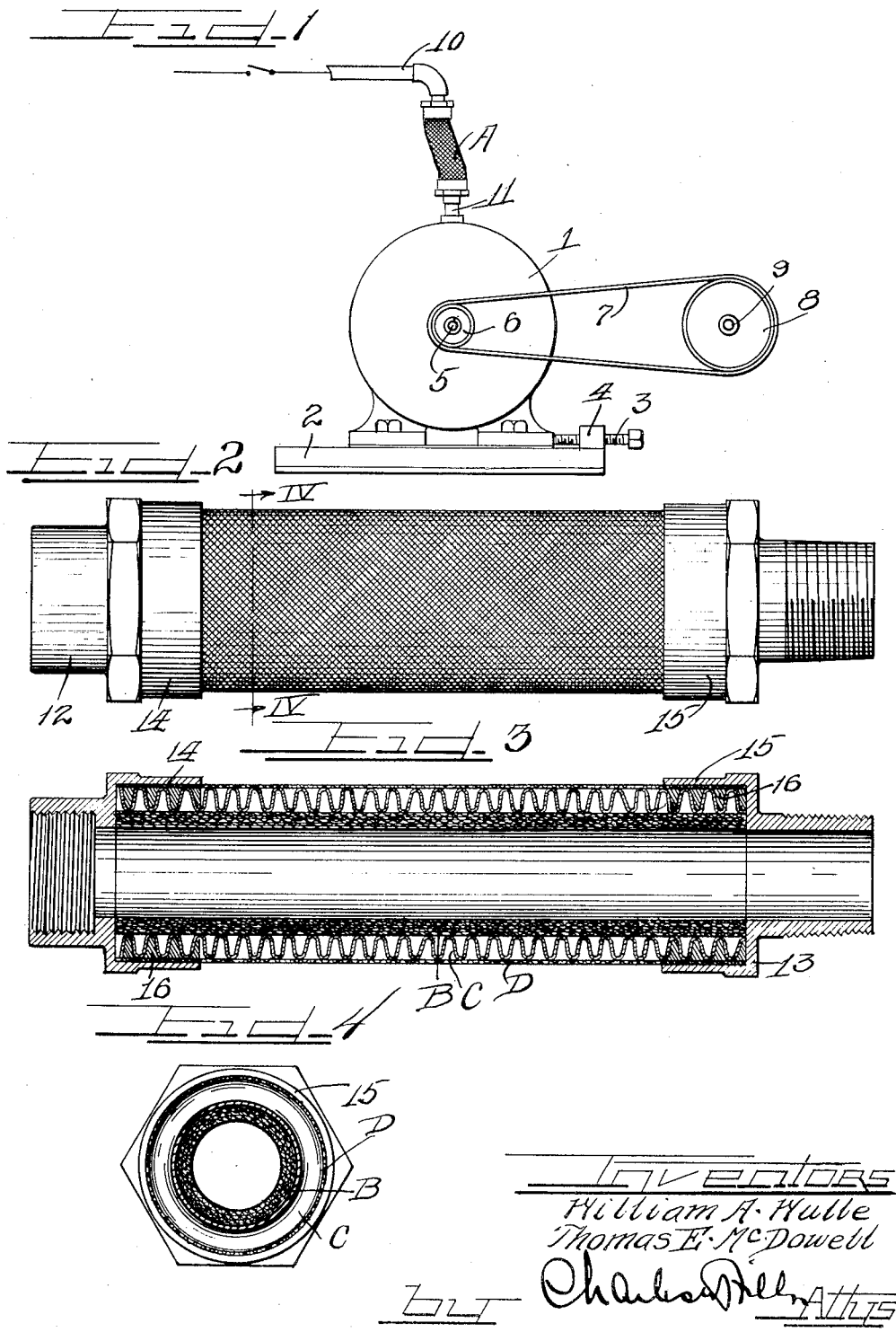

1,993,984

UNITED STATES PATENT OFFICE 1,993,984

EXPLOSIONPROOF FLEXIBLE FITTING

William A. Wulle and Thomas E. McDowell, Chicago, Ill., assignors to The Pyle-National Company, Chicago, Ill., a corporation of New Jersey Application April 28, 1934, Serial No. 722,864

4 Claims. (Cl. 247—18)

The present invention relates to explosion proof flexible fittings, particularly to those designed to conform to the requirements of the National Electrical Code applying to "hazardous locations" and to the requirements of the Underwriters' Laboratories.

The underwriters' requirements for fittings of the present character are set forth in a booklet entitled "Explosion Proof Wiring", by C. W. Gustafson, on pages 18 and 19, as follows:

"It is imperative that the type of wiring employed for Class I locations be the safest available. The rules provide that, 'Rigid conduit with explosion proof joints and fittings shall be employed as the type of wiring.' Rigid conduit provides:

(1) Effective protection against mechanical injury to the conductors.

(2) A low resistance equipment grounding circuit.

(3) Reasonable protection against possible arcs burning through the conduit wall.

(4) Explosion-proof threaded joints or couplings.

Tests have shown that joints in approved rigid conduit with five full threads engaged are explosion proof. Running threads which must necessarily be deeply cut resulting in a rather loose joint, should not be permitted.

It will be found that permission is given in Class I rules to employ an approved flexible fitting of the explosion proof type where it is necessary, as at motor terminals. This is a concession to necessity. We understand that a suitable fitting will shortly be announced. Its use will be limited to those motor installations where it is necessary to shift the motor on its base or where the motion of the motor, as in some types of dry cleaning machinery, renders rigid connection impracticable.

Having provided an explosion proof conduit system it is equally important that fittings, such as outlet boxes, L's, and others, also be explosion proof. Ordinary fittings are not suitable, for should an explosion occur in the conduit, flame or hot gases would undoubtedly issue through the joints of the fitting and ignite the surrounding explosive mixture. Complete varieties of explosion-proof fittings for every conceivable purpose are now available."

The fittings of the present invention are particularly adaptable for use in hazardous places, such, for instance, as in explosive atmospheres or where inflammable volatile liquids, such as gasoline and the like, are made, used, or stored, or combustible dust-laden atmosphere is present, or in places where easily ignitable material, such as fiber, is made, used or stored, and which fittings must be so constructed as to provide explosion-proof joints.

These fittings also are useful in wiring installations where water-tight and vapor-tight flexible connections are desirable. Such fittings must be so constructed as to bend for installation in crowded places, or where vibration is present, and at all times must positively prevent leakage of vapor or moisture at all times, and constructed to prevent breakage due to flexure. The fittings are vapor- and water-tight, and explosion-proof.

It has been found that the gasket type of connection is neither vapor-tight nor explosion proof, as the gasket materials most commonly used are porous, and deteriorate after long periods of service, thus allowing vapor passage, and in the event of explosion become displaced and damaged to such an extent that the flames incident to the explosion reach the combustible atmosphere, causing fire loss.

The fitting of the present invention is directed to a construction of such a character as to provide a flexible fitting which is vapor-tight, water-tight and explosion proof, and which meets with the approval of the Underwriters' Laboratories, as to the following points:

(1) Effective protection against mechanical injury to the conductors.

(2) A low resistance equipment grounding circuit.

(3) Reasonable protection against possible arcs burning through the conduit wall.

(4) Explosion-proof threaded joints or couplings.

An object of the present invention is to provide a flexible explosion-proof fitting for electrical conduits, which fitting is water-tight and explosion proof.

Another object of the invention is to provide a flexible fitting for electrical conduits which is explosion-proof, and which, at the same time, is sufficiently flexible to meet all of the installation requirements of the Underwriters' Laboratories and the National Electrical Code.

A further object of the invention is to provide a flexible explosion-proof fitting having a metallic bellow body to which connection members are permanently connected, as by soldering, brazing or welding.

A still further object of the invention is to provide an explosion-proof flexible enclosure or fitting having a metallic body of bellows tubing, capable of expansion by explosion, which body is surrounded by a flexible braided metallic cover or casing and in which body is a non-metallic loom or liner of woven fibrous material having characteristics of electrical insulation, which serves as a protection to the flexible body against possible short circuits and grounds, and at the same time protects the cable and body from abrasion during flexure of the fitting.

Another and yet further object of the invention is to provide an explosion-proof flexible fitting having a flexible body material impervious to vapor escape and explosion damage and which, at the same time, is capable of expansion, without destruction, in the event of explosion.

A still further object of the invention is to provide an explosion-proof flexible enclosure or fitting capable of withstanding vibration over long periods of time without breakage and without impairing its resistance to explosion.

Generally speaking, the invention contemplates the provision of a body made of metal tubing, which is flexible to a marked degree, and which is expansible without damage in the event of an explosion.

The invention further contemplates the provision of a woven fibrous liner or loom for the tubing, which liner has electrical insulation characteristics.

The invention further contemplates the provision of a braided metallic sleeve about the bellows tube as a protection for the same.

The invention also contemplates the provision of connecting members which are integrally and permanently fastened to the ends of the outer braided sleeve and the bellows tubing, as a continuous conductor for the purpose of electrically grounding the conduit system throughout its extent. There are no sliding or rotative joints to become worn, so that the escape of flame, on the entrance of moisture or vapor, is prevented.

The above, other and further objects of the invention will be apparent from the following description, accompanying drawing, and appended claims.

Figure 1 is an end elevational view of a motor mounted on its base for adjustment, and with a flexible fitting embodying the principles of the present invention, inserted in the wire conduit leading to the motor.

Figure 2 is an enlarged elevational view of an explosion-proof flexible fitting embodying the principles of this invention.

Figure 3 is a longitudinal sectional view through the fitting of Figure 2.

Figure 4 is a transverse vertical sectional view taken substantially in the plane indicated by line IV—IV of Figure 2.

The drawing will now be explained.

Figure 1 is an example of one place where a fitting of the present invention would be advantageously employed.

A motor 1 is mounted on a base 2, and is capable of adjustment with respect to the base 2 by means of a screw 3 threaded into a lug 4 upstanding from the base, as is common practice. The motor shaft 5 carries a pulley 6 which is connected by means of a belt 7 with a pulley 8 on a line shaft 9. The adjusting means for the motor, just described, is especially desirable in maintaining sufficient tension of the belt 7 to secure maximum efficiency of the output of the motor.

In order to allow adjustability of the motor with respect to its base, and without harm to the electrical conductors leading to the motor, a fitting, embodying principles of the present invention, is inserted in the conduit 10 which carries the electrical conductors to the motor. This fitting is designated generally at A and is illustrated as being flexed to compensate for the offset relationship between the conduit 10 and the connection 11 with the motor 1.

The details of the present invention may be readily observed in Figure 3, wherein there is illustrated a treble hose construction consisting of an inner hose, loom, or tubing B, which is of woven material of fibrous or fabric matter, an intermediate hose or body C made of metal tubing, corrugated to provide bellows, and which is extremely flexible. Surrounding the body C is a braided metallic flexible hose D which serves as a protection for the body C.

The lengths of the hoses B, C and D are illustrated as being the same, which is the preferable case in the construction of such fittings.

Attached to one end of the fitting there illustrated, is a female connector 12, and at the other end is a male connector 13. Each of these connectors is provided with a skirt, 14 and 15, respectively, which skirts receive the adjacent ends of the fitting, and which skirts are permanently attached to the ends of the outer flexible braiding hose D and to the ends of the intermediate bellows tubing C, as by brazing or soldering, as illustrated at 16, in the drawing. The length of the inner hose B is such as to tightly engage against the connectors 12 and 13, so that the inner surface of the inner hose B forms a continuation of the openings through such connectors for the electrical conductors.

The permanent securement of the skirts 14 and 15 of the connectors 12 and 13 assures vapor-tight and water-tight connection between the fitting and these connectors.

Forming the intermediate hose C of corrugated metal, bellows fashion, provides for expansion of this portion of the fitting under explosion, without damage to the fitting.

The provision of the inner hose or loom B prevents wire abrasion in the event of flexure or vibration of the fitting in service.

Fittings of the present invention have mechanical characteristics similar to standard flexible conduits, and at the same time meet the demands for explosion-proof and water-tight fittings, in accordance with the National Electrical Code, and also in accordance with the requirements of the Underwriters' Laboratories.

The fitting of the present invention produces neater installations, and eliminates bending and fitting of rigid conduits, especially in crowded places, and provides means for absorbing vibration, which vibration is detrimental to a rigid connection, or to a fitting having sliding or rotative joints.

Such fittings are especially adaptable for safety and ease of application in the wiring of gasoline pumps, explosion-proof flood lights, explosion-proof motors in filling stations, bulk stations, refineries, grain elevators, and other hazardous places. Such fittings are also useful for water-tight installations, for docks, ships, breweries, fountains, swimming pools, and the like, and also for under-water flood lights where adjustments have to be made after installation.

It will be observed that the fittings of the present invention comprise the explosion-proof, water-tight metallic connectors 12 and 13, which are joined by a flexible body comprising the outer flexible metallic braided hose D, the intermediate flexible metallic body preferably of bronze, and the inner hose C of braided or woven fibrous matter or the like, serving as electrical insulator, and for preventing short circuits and grounds between the electrical conductors and the fitting.

It has been ascertained by tests that the electrical resistance introduced into a conduit system by using fittings of the present invention, is negligible, and such tests have shown these fittings to be comparable, length for length, to the resistance of rigid conduits.

We are aware that many changes may be made and numerous details of construction may be varied through a wide range without departing from the principles of this invention, and we, therefore, do not purpose limiting the patent granted hereon otherwise than necessitated by the prior art.

The invention is claimed as follows:

1. An explosion-proof flexible fitting for electrical conduits in hazardous places, comprising a bellows-like metal body capable of expansion due to explosion, a braided metallic sleeve surrounding said body, a braided fibrous flexible tubular electrical insulating lining for the interior of said body, and threaded conduit connecting members at each end of said body.

2. A fluid-tight and explosion-proof flexible coupling for electrical wiring conduits, comprising a treble flexible hose consisting of an inner woven fibrous hose of electrical insulating characteristics, an intermediate metallic bellows tube capable of expansion by explosion, and an outer braided metallic sleeve; and threaded connecting members permanently and electrically fastened to the ends of the intermediate tube and the outer sleeve.

3. An explosion-proof flexible fitting for electrical conduits in hazardous places comprising a bellows-like metal body capable of expansion due to explosion, a braided metallic sleeve surrounding said body, an electrical insulating lining or loom for the interior of said body, and conduit connecting members at each end of said body.

4. An explosion-proof flexible fitting for electrical conduits in hazardous places comprising a bellows-like metal body capable of absorbing vibration, a braided metallic sleeve surrounding said body, a braided fibrous tubular electrical insulating lining for the interior of said body, and conduit connecting members at each end of said body permanently secured to said body in gas tight relation.

WILLIAM A. WULLE.
THOMAS E. McDOWELL.